Jan. 8, 1963 E. C. KOENIG 3,071,972
ROTATING SYSTEMS ANALYZER
Filed July 1, 1957 5 Sheets-Sheet 1
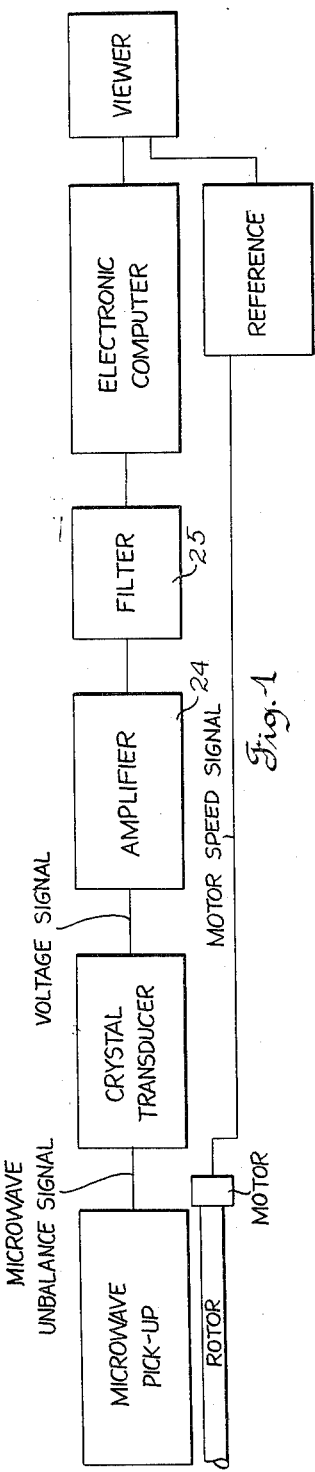
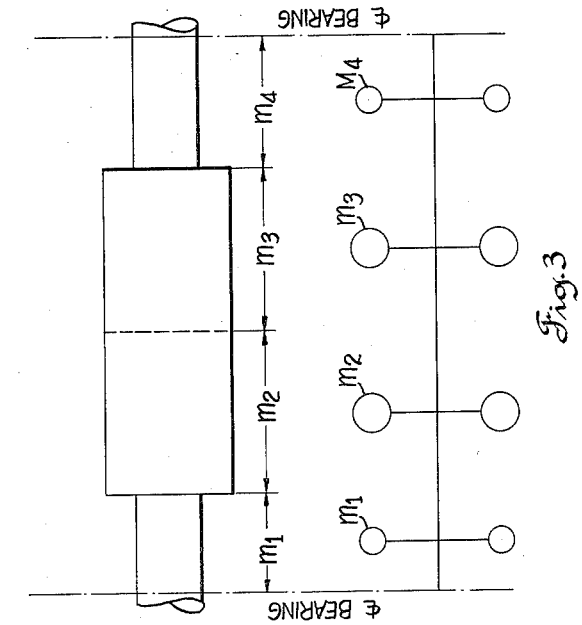
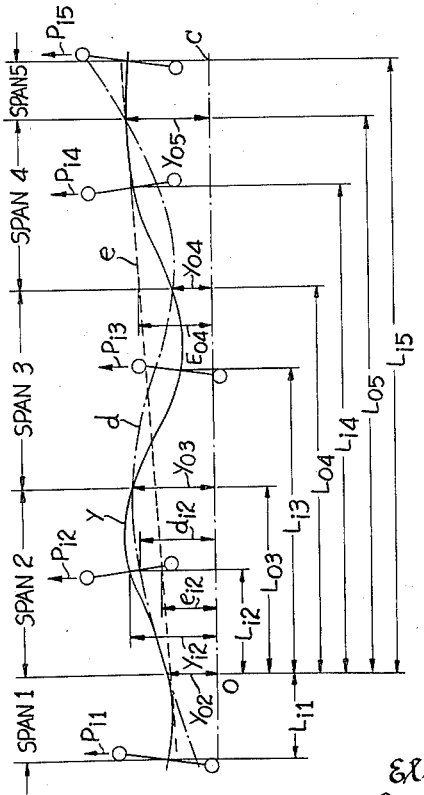
Inventor
Eldo C. Koenig
By Joseph E. Kerwin
Attorney Jan. 8, 1963  E. C. KOENIG  3,071,972
ROTATING SYSTEMS ANALYZER
Filed July 1, 1957  5 Sheets-Sheet 2

Inventor
Eldo C. Koenig
by Joseph E. Kerwin
Attorney

Jan. 8, 1963    E. C. KOENIG    3,071,972
ROTATING SYSTEMS ANALYZER

Filed July 1, 1957    5 Sheets-Sheet 3

Inventor
Eldo C. Koenig
By Joseph E. Kerwin
Attorney

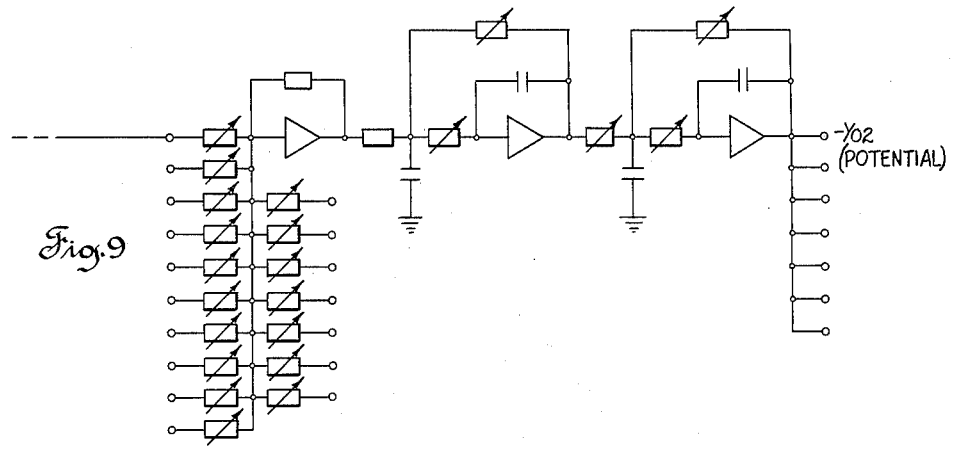
Fig. 9
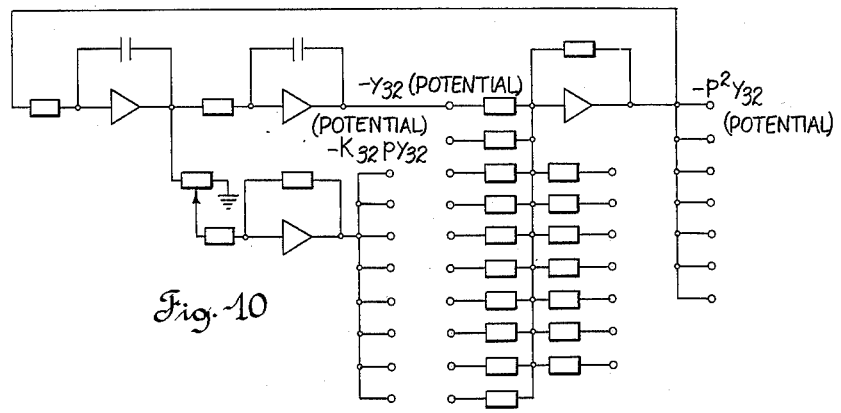
Fig. 10
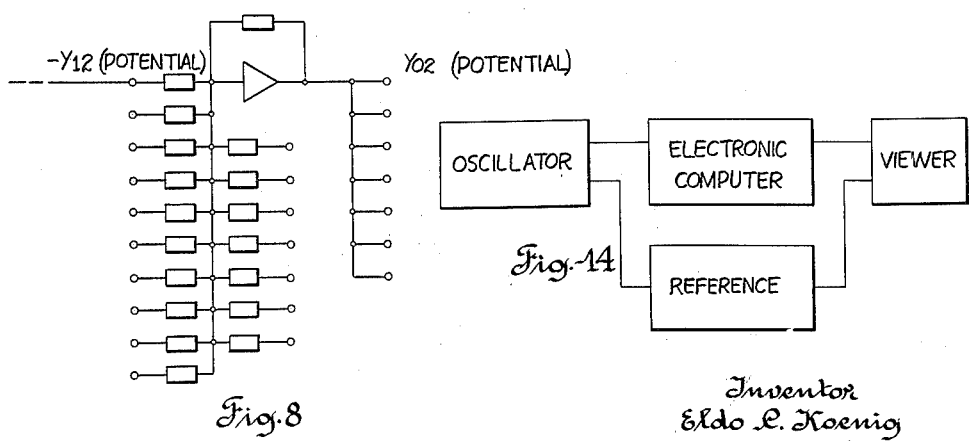
Fig. 8
Fig. 14

Inventor
Eldo C. Koenig
By Joseph E. Kerwin
Attorney

United States Patent Office 3,071,972
Patented Jan. 8, 1963

3,071,972
ROTATING SYSTEMS ANALYZER
Eldo C. Koenig, Waukesha, Wis., assignor to Allis Chalmers Manufacturing Company, Milwaukee, Wis.
Filed July 1, 1957, Ser. No. 669,088
12 Claims. (Cl. 73—462)

This invention relates to analyzing and balancing rotating systems, and in particular to balancing rotors operating above the first critical speed, in regions where the rotor must be considered flexible.

This rotating system analyzer can be utilized to analyze rotating systems and functions either as a device for balancing rotating systems or as a device for simulating rotating systems. It consists of two principal components, a computer component arranged for solving established mathematical relations and a signal deriving component. When used as a balancer the signal deriving component obtains deflections of rotating systems as voltage signals to be fed directly into the computer component. This signal component provides for transducing deflections of the rotating system to voltage signals. When used as a simulator the signal deriving component is an oscillator whose output sinusoidal voltage represents forces of unbalance to be fed directly into the computer.

An object of this invention is to provide an improved balancing system for rotors.

Another object of this invention is to provide systems and methods of rotating systems analyzers to be utilized as a balancer and as a simulator of rotating systems.

The objectives met by this invention are extremely stringent. The signal deriving component is sufficiently sensitive to measure one-half thousandths of an inch deflection of a rotor with a signal to noise ratio of approximately 25 minimum. Vibrations are not transmitted to the component through the supports, that is, vibrations are not permitted to effect a true signal. The component includes deflection measuring devices or units which will remain calibrated within a few percent for an appreciable period of time and relative deviations from calibration between the several deflection measuring devices along the rotor are held to a minimum. Other features of the signal deriving component are its ready adaptability to any type of system so that it can measure deflections of shafts of a wide range of diameters, surface smoothness and materials. It is not in physical contact with the shaft. Further, it is relatively uninfluenced by changes in environmental conditions, such as temperature, humidity and varying air forces at the rotor surface. In addition to these factors, it is relatively important that the signal deriving component can be remotely situated with respect to the computer component.

These and other objects and advantages of this invention will become apparent from a consideration of the following description taken in conjunction with the accompanying drawing, in which:

FIG. 1 is a block diagram illustrating a preferred embodiment of the components of the rotating systems analyzer of this invention;

FIG. 2 illustrates a five span rotating system with the end spans overhung, to be considered in developing mathematical formulas for the computer component of this invention;

FIG. 3 is a symbolic representation of an approximate rotating system obtained from an actual system by assuming distributed masses concentrated in the form of disks or wheels;

FIG. 8 is a representation of a normal computing circuit for representing equations of the type developed for the balancing system;

FIG. 9 is a modification of the computer circuit of FIG. 8 for imposing a stabilizing effect;

FIG. 10 is another computing circuit for another of the type equations developed for the balancing system;

FIG. 14 is a block diagram of the system of this invention embodied in a simulator.

Figure 4:
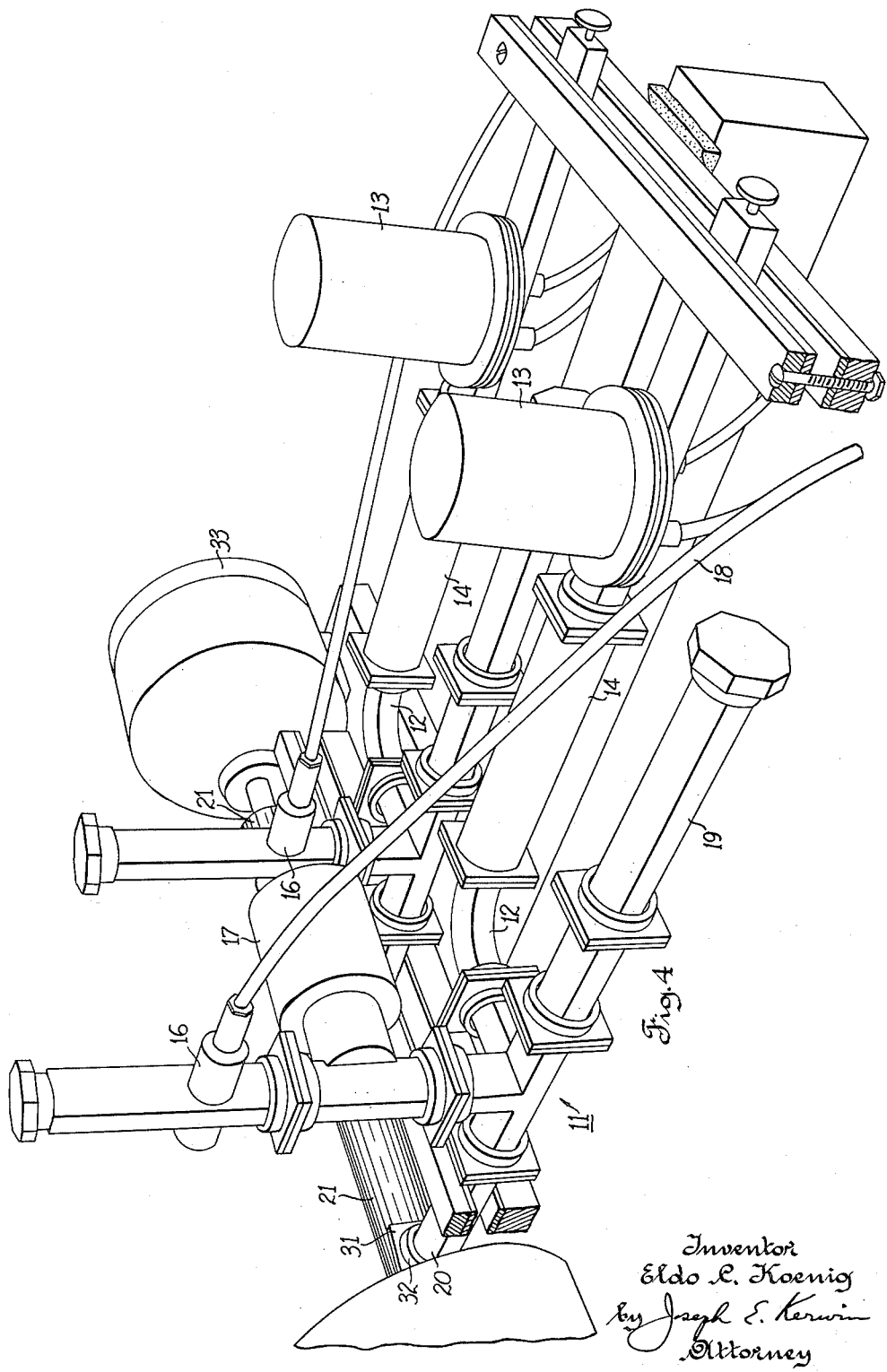
FIG. 4 is an isometric view of a deflection measuring unit constructed and arranged in accordance with this invention.

In the drawing, a microwave pickup 11 is used for measuring rotor deflection under rotating conditions. The microwave device is a hybrid junction made of rectangular wave guides and possesses the properties of a bridge circuit.

Power is supplied to the H arm 12 from an oscillator 13 such as a reflex klystron and as shown the connection is preferably made through a uniline 14, and a circular H plane bend 12. The uniline provides attenuation to reflected power from the hybrid junction that may result from mismatch. The bend is to permit close placing of detector units along short shafts. The klystron tube holder may contain a variable short circuit for impedance matching. A tube found suitable is the type 2K25 with the specifications 8500 to 9666 megacycles frequency range, mechanical tuning, antenna into wave guide type output in the direction of the electric field, 300 volts beam voltage, 22 milliamperes beam current, reflector voltage of approximately minus 160 volts, RF power output 25 milliwatts.

Crystal holder 16 is connected to the E arm of the hybrid junction through a wavemeter 17 which is calibrated to read directly the wave frequency, which wavemeter may be removed after the frequency has been established. The crystal is matched to the wave guide to obtain maximum rectified current brought out through the cable shown at 18. A crystal of type 1N23B has been used and is mounted in the wave guide in the direction of the electric field.

Lengths of the colinear arms are properly related. The effective wave guide length between the short of the reference arm 19 and the hybrid T under matched conditions should preferably be approximately the same as the length of arm 20 beyond the T. For this condition the attenuation in the two arms will be nearly equal when the unit is measuring actual shaft deflections and maximum sensitivity will be obtained. The rotor shaft 21 is disposed beyond arm 20.

Output cable 18 of the detector is connected to amplifier 24 through a low impedance and the current through the impedance is measured with a 5 milliampere meter for the purpose of adjusting the reflector voltage of the oscillator for maximum output. The amplifier output is connected to a variable band pass filter 25 which functions to attenuate extraneous signals.

The signal deriving component shown obtains deflections at a plurality, as at five, locations along a rotating shaft system, as voltage signals, to feed directly into the computer component. That is, there is provided a microwave detector unit at each of the locations.

The relative deviations from calibration between the several units along the rotor should be held to a minimum. Consequently, it is preferred to have a single source of D.C. voltage for the amplifiers and oscillators as well as individual adjustment of oscillator reflector voltage. These requirements arise from the basic operation of the oscillators. It is to be noted that the location of the voltage modes may vary slightly with each oscillator. Consequently, in addition to the requirement that the microwave pickups be supplied from the same voltage source, the reflector voltage for each tube may be adjusted independently.

Figure 5:
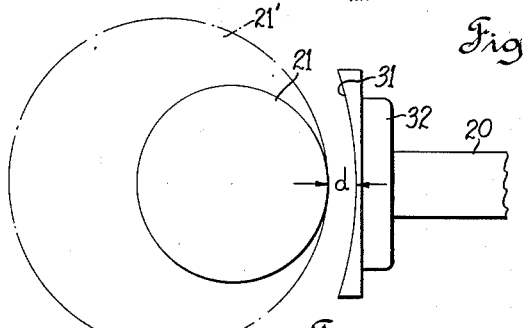
FIG. 5 is an enlarged view of the choke flange and face curvature of the wave guide terminal disposed adjacent the rotating body.

The wave guide horn 31 preferably has a choke flange 32 and is shown enlarged in FIG. 5. The choke flange face is preferably machined to a curvature. In such an embodiment the choking action of the flange is retained for large variation of shaft diameters, preventing field scattering and permitting a wave guide to function as a short for large clearances.

When a microwave is fed into the H arm of the hybrid T, microwave energy appears in the E arm if there is an unbalance in the loads of the two colinear arms. When the hybrid T is disposed, as shown in FIG. 4, with the rotor acting as a terminal of one of the colinear arms, the balance between the two colinear arms depends on the surface position of the rotor. Thus, changes in the surface position of the rotor as the rotor vibrates produce analogous changes in the microwave energy in the E arm of the T.

The displacement voltage signals are fed directly into the computing component, with the computing component capable of solving for the forces of unbalances of the system. The computer component is designed to solve the derived differential equations describing the rotating system. For this purpose mathematical equations are derived for analyzing the rotating system. Mathematical analysis for obtaining the equations for balancing treats the rotor deflections as independent quantities and assumes that they are obtainable from the system under study at several locations along the rotor through the use of the deflection measuring units of the analyzer. The forces of unbalance are the desired unknown quantities in the equations which can be obtained as solutions by the computer component.

In deriving the equations for the simulating of rotating systems, it is assumed that no functions are directly available from the physical system, but that the independent quantities, which in this case are the forces of unbalance, must be generated by some electronic means for solution of the equations by the computer component of the analyzer. The rotor deflections along the rotating system are considered the desired unknowns. Since, when considered as a simulator, the analyzer has no direct connection to the physical system, certain quantities, such as bearing stiffness, are considered variable.

*Derivation of Equations for Balancing Rotating Systems*

A completely general group of equations have been developed for balancing rotating systems with the analyzer. They may be applied to a system with any number of spans with the end spans supported, or with a span overhung on one or both ends. An example of a system of five spans with the end span overhung is illustrated in FIG. 2.

In the analysis, masses with weights producing unbalance will be assumed to exist at all stations along the shaft. Since in practical cases the shaft displacements cannot be measured at certain stations where unbalance is very likely to exist, it will be necessary later to apply the equations to assumed masses and certain other stations balanced in order to reduce the unknowns to a number equal to the number of equations. Also, to keep the computing equipment at minimum, the masses at stations very near the bearings can be set equal to zero in many cases without affecting the accuracy of results appreciably. The five span system shown in FIG. 2 will be referred to in describing the meaning of the symbols employed in the analysis. The system has five spans with the end spans overhung and is rotating at a speed of $\omega$. Curve $y$ is the center line of the shaft under actual operating conditions at a given time $t$ and curve $c$ the axis of rotation. Since the bearing supports are assumed elastic, the center line of the shaft at the bearings may be displaced from the axis of rotation. Curve $e$ is a straight line connecting the centers of the shaft at the end bearings. Curve $d$ intersects curve $y$ at the bearings and is the position the center line of the shaft assumes under static conditions when the displacements at the bearings are unchanged from that of the rotating system.

Each of the concentrated masses, $m$, in the form of a wheel may represent the mass of a section of length of a rotor of an actual system as shown in FIG. 3. They are assumed balanced; that is, their centers of gravity coincide with the center line of the shaft (curve $y$). Attached to these masses at distances $r$ from the center line of the shaft are masses of unbalance, $m'$, which cause the conditions of unbalance.

Damping is considered to be present at each of the masses $m$ and the coefficients of damping are designated by K. Since the air is a fluid and the rotor revolves within it, the damping is viscous and, therefore, the damping force is assumed proportional to the velocity.

Double subscripts such as $uv$ and $iq$ will be used to identify quantities of the system. The second subscripts $q$ or $v$ indicate the span and the first, $i$ or $u$, indicate the station or mass in span $q$ or $v$. It follows that both pairs of subscripts must be used to identify static influence coefficients $A_{uviq}$ (inches per pound) where a one pound force is applied at $iq$ to produce a deflection at location $uv$.

In FIG. 2, displacements and the radii to the unbalance masses are drawn for convenience in a plane containing the axis of rotation. It will be understood they are vector quantities without special designation.

The force of rotation at any mass $i$ in span $q$ is the vector sum, $$P_{iq} = m_{iq}p^2 y_{iq} + K_{iq}p y_{iq} + m'_{iq}p^2(r_{iq}+y_{iq})$$

where $y_{iq}$ is the distance from the center of rotation to the center of the shaft at mass $m_{iq}$ and $p$ symbolizes the derivative with respect to time. Since $r_{iq}$ will be much greater than $y_{iq}$ for the types of systems to be considered, $m'_{iq}p^2 y_{iq}$ may be neglected and the forces at the stations become $$[[P_{iq}]]_{q=1,\ldots z\ i=1,2,\ldots n_q}$$
$$= [[(m_{iq}p^2 + K_{iq}p)y_{iq} p^2 r_{iq}]]_{q=1,\ldots z\ i=1,2,\ldots n_q}$$
$$(2.1) \quad = [[m_{iq}p^2 + K_{iq}p)y_{iq} + U_{iq}]]_{q=1,\ldots z\ i=1,2,\ldots n_q}$$

where $U_{iq} = m'_{iq}p^2 r_{iq}$ is the force of unbalance, $z$ is the number of spans, and $n_q$ is the number of stations or masses in span $q$.

If forces equivalent to $P_{iq}$ of Equation 2.1 acted on the system in the static state with the bearing supports infinitely stiff and in the positions as shown in the figure, the shaft would deflect by an amount equal to the distance between curves $y$ and $d$. The distances $y-d$ of the figure are then either dynamic or static deflections depending on whether the forces $P_{iq}$ are rotational forces or equivalent static forces and can be defined in terms of the static influence coefficients and the rotational forces as follows:

$$-[[y_{uv} - d_{uv}]]_{v=1,\ldots z\ u=1,2,\ldots n_v}$$
$$= \left[\left[\sum_{i=1}^{nq}\sum_{q=1}^{Z} A_{uviq} P_{iq}\right]\right]_{v=1,\ldots z\ u=1,2,\ldots n_v}$$

(2.2)

where $n_v$ is the number of stations in span $v$ where $y$ and $d$ are being considered.

The first step in defining the quantities $d$ of Equation 2.2 is to assume the removal of all but the two end supports, which are assumed to have infinite stiffness, and in the static condition consider the application of a one pound force, first at one intermediate bearing location and then at the other, to obtain the static influence coefficients $A_{uv03}$ and $A_{uv04}$. The displacements $d_{03}-e_{03}$ and $d_{04}-e_{04}$ can then be defined as $$d_{03}-e_{03} \equiv y_{03}-e_{03} = A_{0303}P_{03} + A_{0304}P_{04}$$
$$d_{04}-e_{04} \equiv y_{04}-e_{04} = A_{0403}P_{03} + A_{0404}P_{04}$$

where $P_{03}$ and $P_{04}$ are the forces at the bearing locations required to give these displacements. For any number of spans $z$, the equations can be rearranged and written as:

(2.3)
$$[y_{0v}]_{v=3,\ldots,(z-1)} = \left[ e_{0v} + \sum_{q=3}^{z-1} A_{0v0q}P_{0q} \right]_{v=3,\ldots,(z-1)} (z > 3)$$

where the geometric relation of $e_{0v}$ to the system is (2.4)
$$[e_{0v}]_{v=3,\ldots,(z-1)} = [y_{0z}(L_{0z}-L_{0v})L_{0z}^{-1} + y_{0z}L_{0v}L_{0z}^{-1}]_{v=3,\ldots,(z-1)} (z > 3)$$

For a system of spans equal to or less than 3 these two equations do not apply. Similarly, the quantities $d_{uv}$ at stations other than at the bearings are:

(2.5)
$$[[d_{uv}]]_{v=1,2,\ldots,z\ u=1,2,\ldots,n_v}$$
$$= \left[\left[ e_{uv} + \sum_{q=3}^{z-1} A_{uv0q}P_{0q} \right]\right]_{v=1,2,\ldots,z\ u=1,2,\ldots,n_v}$$

If the lengths $L_{uv}$ are measured from the center line of the bearings between span 1 and 2 to masses $m_u$ in span $v$ so that the values of $L_{u1}$ are negative, the geometric relation of $e_{uv}$ to the system is (2.6)
$$[[e_{uv}]]_{v=1,\ldots,z\ u=1,2,\ldots,n_v} = [[y_{0z}(L_{0z}-L_{uv})L_{0z}^{-1} + y_{0z}L_{0v}L_{0z}^{-1}]]_{v=1,\ldots,z\ u=1,2,\ldots,n_v}$$

From the general Equations 2.1 through 2.6 the equations for any type system may be written. If the system under consideration has no overhanging spans, the terms of the equations involving those spans are made zero.

If only the forces $U_{iq}$ producing unbalancing are to be determined and the deflections $y_{iq}$ and $y_{oq}$ are known by measurement, $P_{0q}$, $e_{0v}$, $e_{uv}$, and $d_{uv}$ may be eliminated by relatively simple substitution. The deflections $y_{0q}$ at the center of the bearings cannot be measured, as a rule, and to keep the unknowns equal to the number of equations the masses at the stations nearest the bearings may be assumed balanced, i.e., the quantities $U$ at these stations are assumed equal to zero. If the masses most likely to be unbalanced are irregular in shape so that deflections cannot be measured at these stations, masses at other stations that are likely to be balanced may be assumed balanced so that, again, the unknowns equal the number of equations.

*Derivation of Equations for Simulating Rotating Systems*

In addition to having a computer method for obtaining a direct solution for the weights of unbalance of a system, a means for readily determining the effects of certain changes in the system is also desirable. During the design stage of a rotor such a method would provide a rapid and inexpensive means of predicting the performance and changes could then be made at this stage rather than after a machine is built and put into service when changes in a system, such as a large turbine generator, are very expensive. An analyzer circuit constructed for this purpose could readily determine:

(1) The effects of bearing stiffness.

(2) The sensitivity of the system to unbalance weights at the different masses.

(3) The effects of damping.

(4) The critical speeds.

Parts of the preceding analysis can be applied in the derivations of the equations for studying the effects of changes in a system. The weights of unbalance instead of shaft displacements become the independent variables and must be generated by electronic equipment as driving functions for the computer circuit. The bearing stiffnesses were not expressed explicitly in the preceding analysis because the rotor deflections were measured quantities. Since here the deflections are the unknowns, the analysis must also be extended to the supports of a system and bearing stiffnesses are required.

A completely general group of equations will be developed as was done for balancing. The Equations 2.1 and 2.2 apply here also. They are $$[[P_{iq}]]_{q=1,\ldots,z\ i=1,2,\ldots,n_q}$$

(2.1)
$$= [[(m_{iq}p^2 + K_{iq}p)y_{iq}]]_{q=1,\ldots,z\ i=1,2,\ldots,n_q}$$
$$- [[y_{uv} - d_{uv}]]_{v=1,\ldots,z\ u=1,2,\ldots,n_v}$$

(2.2)
$$= \left[\left[ \sum_{i=1}^{n_q} \sum_{b=1}^{z} A_{uviq}p_{iq} \right]\right]_{v=1,\ldots,z\ u=1,2,\ldots,n_v}$$

The Equations 2.3 through 2.6 cannot be applied and in order to define $d_{uv}$, the reactions at the bearings $R_{0q}$ must be determined. These reaction forces are (2.7)
$$[R_{0q}C_{0q}^{-1}]_{q=2,2,\ldots,z} = \left[ \sum_{i=1}^{n_q} \sum_{q=1}^{z} C_{0viq}p_{iq} \right]_{v=2,3,\ldots,z}$$

where the quantities $C_{0viq}$ are static influence coefficients obtained by applying one pound forces at the mass stations with the proper values of bearing stiffnesses, $C_{0q}$ (pounds per inch) assigned to the system. Then $d_{uv}$ may be expressed as $$[[d_{uv}]]_{v=1,2,\ldots,z\ u=1,2,\ldots,n_v}$$

(2.8)
$$= \left[\left[ \sum_{q=2}^{z} C_{uv0q}R_{0q} \right]\right]_{v=1,2,\ldots,z\ u=1,2,\ldots,n_v}$$

where the quantities $C_{uv0q}$ are static influence coefficients obtained by applying one pound forces at the bearing locations with the chosen values of bearing stiffnesses $C_{0q}$ assigned to the system.

For the case of $z=3$, i.e., the number of bearing supports is two, the amount of calculations may be reduced by taking advantage of simple geometric relations of certain quantities. The quantities $d_{uv}$ may be defined as (2.9)
$$[[d_{uv}]]_{v=1,2,3\ u=1,2,\ldots,n_v} = [[y_{02}(L_{03}-L_{uv})L_{03}^{-1} + y_{03}L_{uv}L_{03}^{-1}]]_{v=1,2,3\ u=1,2,\ldots,n_v}$$

where (2.10)
$$Y_{02} = C_{02}^{-1} \sum_{i=1}^{n_q} \sum_{q=1}^{z} P_{iq}(_{03}-L_{iq})L_{03}^{-1}$$

and (2.11)
$$Y_{03} = C_{03}^{-1} \sum_{i=1}^{n_q} \sum_{q=1}^{z} P_{iq}L_{iq}L_{03}^{-1}$$

For this case, the bearing stiffnesses $C_{02}$ and $C_{03}$ may be varied directly on the analyzer without intervening digital calculations.

These differential equations represent a rotating system and may be simulated on the rotating systems analyzer. They are linear differential equations only if the bearing stiffnesses are constant for all angles of rotation of the rotor. If the bearing stiffnesses are not constant, the equations are very difcult to solve except for the simplest case of a two support system.

Before the equations can be solved on the analyzer, the coefficients must be calculated manually or by digital computing machines.

Computing Section of the Rotating Systems Analyzer

For application of the analyzer as a balancer, the displacement signals from the displacement measuring equipment are to be fed directly into the computing section. It will be assumed that these signals are to be obtained from a two support system and that adverse conditions prevail. It is required that the computing section be capable of solving for the forces of unbalance of such a system. For simpler cases of the two support system or for certain simple systems of more than two supports, the computing circuit may be easily modified and certain parts made inoperative.

The analyzer is also to be used as a simulator of rotating systems. With the addition of certain components and by fully utilizing the computing equipment required for the balancer, a two support system with six masses may be simulated. Six signals representing forces of unbalance are generated electronically and drive the computing circuit. With minor modifications of the circuit and with parts of the circuit made inoperative, systems of more than two supports but with less than six masses may be studied.

Figure 6:
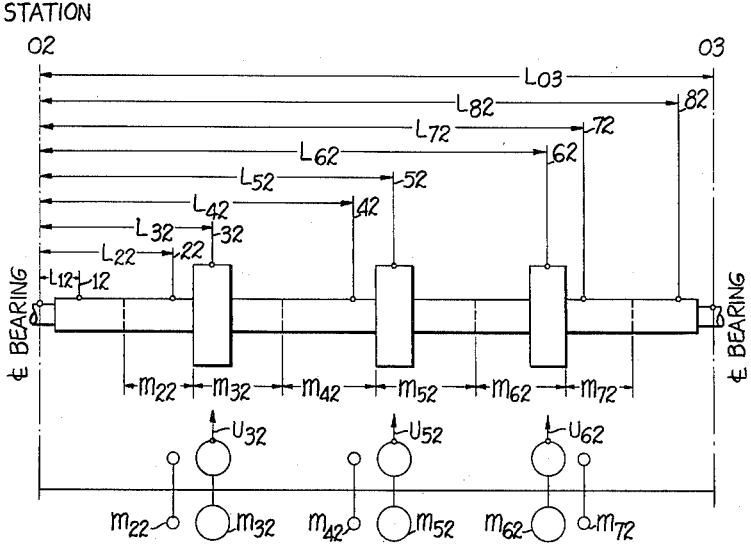
FIG. 6 is a symbolic showing of a shaft system considered in the design of the computing component for balancing a rotating system.

To determine the design requirements of the computing section, it is necessary to write down and inspect equations derived before. For the balancer, the system under consideration is to have three spans with the overhung spans 1 and 3 of zero length. The number of stations chosen for the center span (span 2) is ten as shown in FIG. 6. Then from Equations 2.1 and 2.2.

(6.1)
$$[P_{i2}]_{i=1,2\ldots 8} = [(m_{i2}p^2 + K_{i2}p)y_{i2} + U_{i2}]_{i=1,2\ldots 8}$$

(6.2)
$$-[y_{u2} - d_{u2}]_{u=1,2\ldots 8} = \left[\sum_{u=1}^{8} A_{u2i2}P_{i2}\right]_{u=1,2\ldots 8}$$

and when the summation term is expanded, there results:

(6.3)
$$-[y_{u2} - d_{u2}]_{u=1,2\ldots 8} = [A_{u212}P_{12} + A_{u222}P_{22} + A_{u232}P_{32} + A_{u242}P_{42} + A_{u252}P_{52} + A_{u262}P_{62} + A_{u272}P_{72} + A_{u282}P_{82}]_{u=1,2\ldots 8}$$

Since Z=3 in this case, Equation 2.3 and 2.4 do not apply. From 2.5 and 2.6 there is obtained:

(6.4)
$$[d_{u2}]_{u=1,2\ldots 8} = [e_{u2}]_{u=1,2\ldots 8}$$

and (6.5)
$$[e_{u2}]_{u=1,2\ldots 8} = [y_{02}(L_{03} - L_{u2})L_{03}^{-1} + y_{03}L_{u2}L_{03}^{-1}]_{u=1,2\ldots 8}$$

The quantities $d_{u2}$ and $e_{u2}$ may easily be eliminated from Equations 6.3, 6.4 and 6.5 by simple substitution and the following equation results:

(6.6)
$$[-y_{u2}]_{u=1,2\ldots 8} = [A_{u212}P_{12} + A_{u222}P_{22} + A_{u232}P_{32} + A_{u242}P_{42} + A_{u252}P_{52} + A_{u262}P_{62} + A_{u272} + A_{u282}P_{82} - y_{02}(L_{03} - L_{u2})L_{03}^{-1} - y_{03}L_{u2}L_{03}^{-1}]_{u=1,2\ldots 8}$$

By inspection of Equations 6.1 and 6.6 it can be seen that if $y_{u2}$, $y_{02}$, and $y_{03}$ can be measured, the unknown quantities are the eight forces of unbalance, $U_{u2}$. However, the displacements $y_{02}$ and $y_{03}$ at the center of the bearing supports cannot be measured and, to include conditions which may exist, the large masses at stations 32, 52 and 62 are assumed to have irregular surfaces so that displacements $y_{32}$, $y_{52}$ and $y_{62}$ likewise cannot be measured. This means there are eight equations and 13 unknowns, but the masses at stations 12, 22, 42, 72 and 82 are of such physical dimensions that forces of unbalance are not likely to occur. Thus, the unknowns become $y_{02}$, $y_{03}$, $y_{32}$, $U_{32}$, $y_{52}$, $U_{52}$, $y_{62}$ and $U_{62}$.

Certain simplifications can be made in the equations to reduce the amount of computing equipment. Since the masses at stations nearest the bearings, stations 12 and 82, are relatively small and the forces they produce have very little influence on the rest of the system, they may be neglected.

With the quantities $P_{12}$, $P_{82}$, $U_{22}$, $U_{42}$ and $U_{72}$ of Equation 6.1 set equal to zero and the remaining quantities substituted in 6.6, the following equation results:

(6.7)
$$[-y_{u2}]_{u=1,2\ldots 8} = [A_{u222}(m_{22}p^2 + K_{22}p)y_{22} + A_{u232}[(m_{32}p^2 + K_{32}p)y_{32} + U_{32}] + A_{u242}(m_{42}p^2 + K_{42}p)y_{42} + A_{u252}[(m_{52}p^2 + K_{52}p)y_{52} + U_{52}] + A_{u262}[(m_{62}p^2 + K_{62}p)y_{62} + U_{62}] + A_{u272}(m_{72}p^2 + K_{72}p)y_{72} - y_{02}(L_{03} - L_{u2})L_{03}^{-1} - y_{03}L_{u2}L_{03}^{-1}]_{u=1,2\ldots 8}$$

From 6.7 an equation can be written for each station and the terms arranged in a manner desirable for the construction of the computer circuit.

(6.8a)
$$y_{02} = \{y_{12} + A_{1222}(m_{22}p^2 + K_{22}p)y_{22} + A_{1232}[(m_{32}p^2 + K_{32}p)y_{32} + U_{32}] + A_{1242}(m_{42}p^2 + K_{42}p)y_{42} + A_{1252}[(m_{52}p^2 + K_{52}p)y_{52} + U_{52}] + A_{1262}[(m_{62}p^2 + K_{62}p)y_{62} + U_{62}] + A_{1272}(m_{72}p^2 + K_{72}p)y_{72} - y_{03}L_{12}L_{03}^{-1}\}\frac{L_{03}}{(L_{03} - L_{12})}$$

(6.8b)
$$y_{03} = \{A_{8222}(m_{22}p^2 + K_{22}p)y_{22} + A_{8232}[(m_{32}p^2 + K_{32}p)y_{32} + U_{32}] + A_{8242}(m_{42}p^2 + K_{42}p)y_{42} + A_{8252}[(m_{52}p^2 + K_{52}p)y_{52} + U_{52}] + A_{8262}[(m_{62}p^2 + K_{62}p)y_{62} + U_{62}] + A_{8272}(m_{72}p^2 + K_{72}p)y_{72} + y_{82} - y_{02}(L_{03} - L_{82})L_{03}^{-1}\}\frac{L_{03}}{L_{82}}$$

(6.8c)
$$-p^2 y_{32} = \{A_{3232}K_{32}py_{32} + y_{32} + A_{3222}(m_{22}p^2 + K_{22}p)y_{22} + A_{3232}U_{32} + A_{3242}(m_{42}p^2 + K_{42}p)y_{42} + A_{3252}[(m_{52}p^2 + K_{52}p)y_{52} + U_{52}] + A_{3262}[(m_{62}p^2 + K_{62}p)y_{62} + U_{62}] + A_{3272}(m_{72}p^2 + K_{72}p)y_{72} - y_{02}(L_{03} - L_{32})L_{03}^{-1} - y_{03}L_{32}L_{03}^{-1}\}\frac{1}{A_{3232}m_{32}}$$

(6.8d)
$$-U_{32} = \{A_{2222}(m_{22}p^2 + K_{22}p)y_{22} + y_{22} + A_{2232}(m_{32}p^2 + K_{32}p)y_{32} + A_{2242}(m_{42}p^2 + K_{42}p)y_{42} + A_{2252}[(m_{52}p^2 + K_{52}p)y_{52} + U_{52}] + A_{2262}[(m_{62}p^2 + K_{62}p)y_{62} + U_{62}] + A_{2272}[m_{72}(m_{72}p^2 + K_{72}p)y_{72}] - y_{02}(L_{03} - L_{22})L_{03}^{-1} - y_{03}L_{22}L_{03}^{-1}\}\frac{1}{A_{2232}}$$

(6.8e)
$$-p^2 y_{52} = \{A_{5252}K_{52}py_{52} + y_{52} + A_{5222}(m_{22}p^2 + K_{22}p)y_{22} + A_{5232}[(m_{32}p^2 + K_{32}p)y_{32} + U_{32}] + A_{5242}(m_{42}p^2 + K_{42}p)y_{42} + A_{5252}U_{52} + A_{5262}[(m_{62}p^2 + K_{62}p)y_{62} + U_{62}] + A_{5272}(m_{72}p^2 + K_{72}p)y_{72} - y_{02}(L_{03} - L_{52})L_{03}^{-1} - y_{03}L_{52}L_{03}^{-1}\}\frac{1}{A_{5252}m_{52}}$$

$$-U_{52} = \{A_{4222}(m_{22}p^2+K_{22}p)y_{22}$$
$$+A_{4232}[(m_{32}p^2)y_{32}+u_{32}]$$
$$+A_{4242}(m_{42}p^2+K_{42}p)y_{42}+y_{42}$$
$$+A_{4252}(m_{52}p^2+K_{52}p)y_{52}$$
$$+A_{4262}(m_{62}p^2+K_{62}p)y_{62}+U_{62}$$
$$+A_{4272}(m_{72}p^2+K_{72}p)y_{72}$$
$$-y_{02}(L_{03}-L_{42})L_{03}^{-1}$$

(6.8f) $$-y_{03}L_{42}L_{03}^{-1}\}\frac{1}{A_{4252}}$$

$$-p^2y_{62} = \{A_{6262}K_{62}py_{62}+y_{62}$$
$$+A_{6222}(m_{22}p^2+K_{22}p)y_{22}$$
$$+A_{6232}[(m_{32}p^2+K_{32}p)y_{32}+U_{32}]$$
$$+A_{6242}(m_{42}p^2+K_{42}p)y_{42}$$
$$+A_{6252}[(m_{52}p^2+K_{52}p)y_{52}+U_{52}]$$
$$+A_{6262}U_{62}$$
$$+A_{6272}(m_{72}p^2+K_{72}p)y_{72}$$
$$-y_{02}(L_{03}-L_{62})L_{03}^{-1}$$

(6.8g) $$-y_{03}L_{62}L_{03}^{-1}\}\frac{1}{A_{6262}m_{62}}$$

$$-U_{62} = \{A_{7222}(m_{22}p^2+K_{22}p)y_{22}$$
$$+A_{7232}[(m_{32}p^2+K_{32}p)y_{32}+U_{32}]$$
$$+A_{7242}(m_{42}p^2+K_{42}p)y_{42}$$
$$+A_{7252}[(m_{52}p^2+K_{52}p)y_{52}+U_{52}]$$
$$+A_{7262}(m_{62}p^2+K_{62}p)y_{62}$$
$$+A_{7272}(m_{72}p^2+K_{72}p)y_{72}+y_{72}$$
$$-y_{02}(L_{03}-L_{72})L_{03}^{-1}$$

(6.8h) $$-y_{03}L_{72}L_{03}^{-1}\}\frac{1}{A_{7262}}$$

Figure 7:
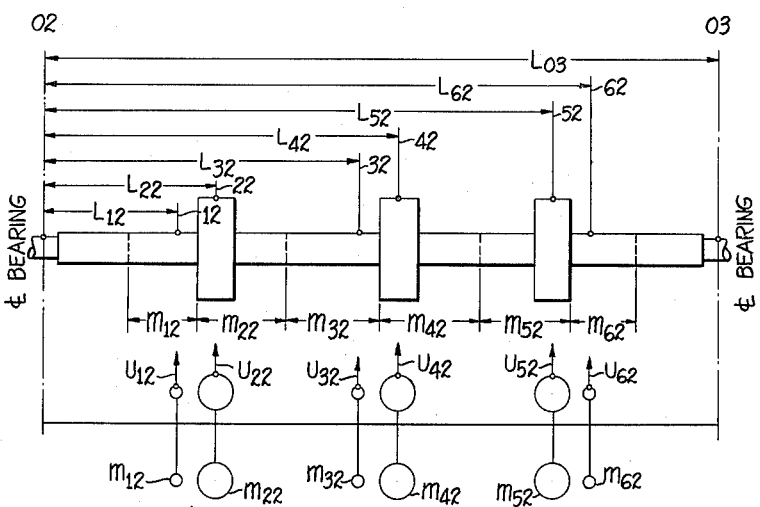
FIG. 7 is a symbolic showing of a shaft system considered in the design of the computing component for simulating a rotating system.

FIG. 7 shows a single span system divided into six stations which are assumed to have equivalent concentrated masses and is the type system around which the computing section is designed in application to a simulator of rotating systems. In applying the equations the system is considered to have three spans with the overhung spans 1 and 3 of zero lengths. Then for this system, $z=3$ and Equation 2.1 becomes:

$$[P_{12}]_{i=1,2\ldots 6} = [(m_{12}p^2+K_{12}p)y_{12}+U_{12}]_{i=1,2\ldots 6}$$
(6.9)

From (2.2) there is obtained:

$$-[y_{u2}-d_{u2}]_{u=1,2\ldots 6} = \left[\sum_{i=1}^{6}A_{u2i2}P_{i2}\right]_{u=1,2\ldots 6}$$

or $$-[y_{u2}-d_{u2}]_{u=1,2\ldots 6} = [A_{u212}P_{12}+A_{u222}P_{22}+A_{u232}P_{32}$$
(6.10) $$+A_{u242}P_{42}+A_{u252}P_{52}+A_{u262}P_{62}]_{u=1,2\ldots 6}$$

From (2.9) $d_{u2}$ is defined as:

$$[d_{u2}]_{u=1,2\ldots 6} = [y_{02}(L_{03}-L_{u2})L_{03}^{-1}$$
(6.11) $$+y_{03}L_{u2}L_{03}^{-1}]_{u=1,2\ldots 6}$$

and from (2.10) and (2.11)

(6.12)

$$y_{02} = C_{02}^{-1}\sum_{i=1}^{6}P_{i2}(L_{03}-L_{i2})L_{03}^{-1}$$

$$= \frac{1}{C_{02}L_{03}}[P_{12}(L_{03}-L_{12})+P_{22}(L_{03}-L_{22})+P_{32}(L_{03}-L_{32})$$
$$+P_{42}(L_{03}-L_{42})+P_{52}(L_{03}-L_{52})+P_{62}(L_{03}-L_{62})]$$

(6.13)

$$y_{03} = C_{03}^{-1}\sum_{i=1}^{6}P_{i2}L_{i2}L_{03}^{-1}$$

$$= \frac{1}{C_{03}L_{03}}[P_{12}L_{12}+P_{22}L_{22}+P_{32}L_{32}+P_{42}L_{42}+P_{52}L_{52}$$
$$+P_{62}L_{62}]$$

When the values of $P_{i2}$ and $d_{u2}$ of Equations 6.9 and 6.11 are substituted in 6.10 and the terms rearranged, there is obtained:

$$[-y_{u2}]_{u=1,2\ldots 6} = [A_{u212}[(m_{12}p^2+K_{12}p)y_{12}+U_{12}]$$
$$+A_{u222}[(m_{22}p^2+K_{22}p)y_{22}+U_{22}]+A_{u232}[(m_{32}p^2$$
$$+K_{32}p)y_{32}+U_{32}]+A_{u242}[(m_{42}p^2+K_{42}p)y_{42}+U_{42}]$$
$$+A_{u252}[(m_{52}p^2+K_{52}p)y_{52}+U_{52}]+A_{u262}[(m_{62}p^2$$
$$+K_{62}p)y_{62}+U_{62}]-y_{02}(L_{03}-L_{u2})L_{03}^{-1}$$
(6.14) $$-y_{03}L_{u2}L_{03}^{-1}]_{u=1,2\ldots 6}$$

After substituting $P_{12}$ of (6.9) in Equations 6.12 and 6.13, $y_{02}$ and $y^6_3$ are defined as:

(6.15)
$$y_{02} = \{(L_{03}-L_{12})[(m_{12}p^2+K_{12}p)y_{12}+U_{12}]$$
$$+(L_{03}-L_{22})[(m_{22}p^2+K_{22}p)y_{22}+U_{22}]$$
$$+(L_{03}-L_{32})[(m_{32}p^2+K_{32}p)y_{32}+U_{32}]$$
$$+(L_{03}-L_{42})[(m_{42}p^2+K_{42}p)y_{42}+U_{42}]$$
$$+(L_{03}-L_{52})[(m_{52}p^2+K_{52}p)y_{52}+U_{52}]$$
$$+(L_{03}-L_{62})[(m_{62}p^2+K_{62}p)y_{62}+U_{62}]\}\frac{1}{C_{02}L_{03}}$$

(6.16)
$$y_{03} = \{L_{12}[(m_{12}p^2+K_{12}p)y_{12}+U_{12}]$$
$$+L_{22}[(m_{22}p^2+K_{22}p)y_{22}+U_{22}]$$
$$+L_{32}[(m_{32}p^2+K_{32}p)y_{32}+U_{32}]$$
$$+L_{42}[(m_{42}p^2+K_{42}p)y_{42}+U_{42}]$$
$$+L_{52}[(m_{52}p^2+K_{52}p)y_{52}+U_{52}]$$
$$+L_{62}[(m_{62}p^2+K_{62}p)y_{62}+U_{62}]\}\frac{1}{C_{03}L_{03}}$$

The six equations of (6.14) and Equations 6.15 and 6.16 are the eight equations to be solved for the unknown quantities $y_{u2}$, $y_{02}$, and $y_{03}$. The assumed known quantities are the forces of unbalance, $U_{u2}$, and are the driving functions to the computer, generated electronically.

Equations 6.8 for balancing and Equations 6.14, 6.15 and 6.16 for simulating rotating systems are to be considered in designing the computing section. There are two general types of equations involved in the first group, for example, (6.8a) and (6.8c). For type (6.8a) the equation does not contain derivatives of the unknown function. The normal computing circuit for such an equation is shown in FIG. 8. A single operational amplifier functions as an adder with 17 inputs, where the inputs are obtained from the computing circuits of the remaining equation of (6.8) through potentiometers to ground.

For the type equation represented by (6.8c), the computing circuit may be constructed as shown in FIG. 10 which is a normal circuit for an equation of the second degree. The large number of inputs to the adder results from coupling with other equation circuits and the first and second derivatives of the function in turn feed to adders of other equation circuits through potentiometers to ground.

The source of the driving functions for the balancing circuit is the microwave pickups. These signals are displacements $y_{12}$, $y_{22}$, $y_{42}$, $y_{72}$ and $y_{82}$. By inspection of the equations (6.8), it is noted that the first and second derivatives of $y_{22}$, $y_{42}$ and $y_{72}$ are present and, theoretically, these can be obtained from the displacement signals by differentiation as shown in FIG. 11.

Figure 11:
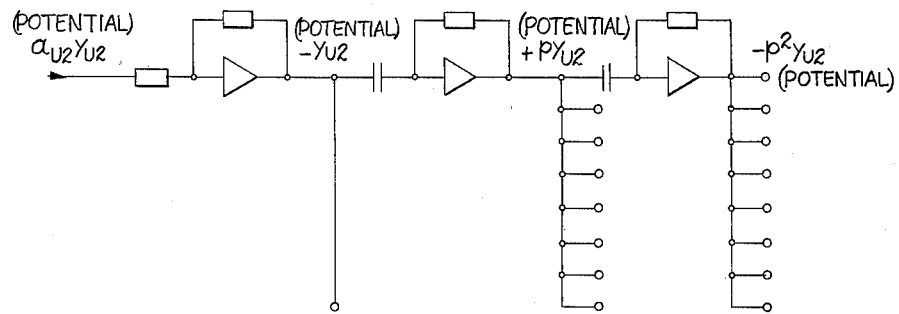
FIG. 11 represents a differentiating circuit for obtaining first and second derivatives of input signals.

Unfortunately, the complete circuit for the eight equations of (6.8) would not be workable if constructed from the three basic circuits of FIGS. 8, 10 and 11. There are three sources of difficulties:

(1) The large number of potentiometers
(2) The differentiator circuits
(3) The circuits (FIG. 8) for solving the algebraic equations.

If potentiometers are used, a single amplifier would be required to drive as many as eight potentiometers in parallel to ground, and if 100K potentiometers are used, the output impedance would be 12,500 ohms. If the input resistors to the adders are as much as one megohm and the setting on a potentiometer is 0.5, the actual input impedance for this single input to the adder would be nearly $$1 \times 10^6 + 0.025 \times 10^6 \text{ ohms}$$

instead of one megohm, or a maximum error of 2.5 percent would be introduced. If, instead, 50K potentiometers are used, this error would be reduced to half, but the amplifier driving the eight potentiometers would be delivering output to a load of 6,250 ohms which would reduce the range of voltage operation of the average operational amplifier considerably unless a special booster amplifier, such as a cathode follower, followed the operational amplifier.

Since potentiometers are suitable for coefficient settings in the range of zero and one, additional amplifiers would be required for coefficients greater than one. It would be a bit awkward and undesirable to scale the equations to have all coefficients less than one, and a large number of these coefficient amplifiers would be required.

To avoid potentiometers the outputs of the amplifiers are connected directly to the adders and the adders themselves become the coefficient multipliers by varying their input resistors accordingly. The operation of an adder is described by the following equation (6.17)
$$e_0 = R_f \left( \frac{e_1}{R_1} + \frac{e_2}{R_2} + \cdots \frac{e_n}{R_n} \right) \frac{A}{(1-A) + R_f \left( \frac{1}{R_1} + \frac{1}{R_2} + \cdots \frac{1}{R_n} \right)}$$

where $e_0$ is the output voltage, $e_1, e_2, \ldots e_n$ are input voltages applied to the input resistors $R_1, R_2, \ldots R_n$ and $A$ is the amplifier gain. For high amplifier gain, the equation may be written as (6.18) $\quad e_0 \cong \frac{R_f}{R_1} e_1 + \frac{R_f}{R_2} e_2 + \cdots \frac{R_f}{R_n} e_n$ Thus, the input resistors $R_1, R_2, \ldots R_n$ may be adjusted to obtain the coefficient multipliers of the input voltages $e_1, e_2, \ldots e_n$. The feedback resistor $R_f$ was given a value of 100K ohms so that for a range of coefficients from 0.01 to 2.0 the input resistors vary from 10 megohms to 50K ohms. The wide range of input resistances to the adders is obtained by a 100K variable wire wound resistor in series with a special decade resistor. The variable resistor is a single turn type with a resistance tolerance of plus or minus one percent and because of its plastic construction, including a plastic shaft, has good high frequency characteristics.

The only frequency involved in obtaining a solution for balancing is the rotating frequency of the shaft. The displacement signals from the rotating system will always contain other frequencies which result from certain bearing or shaft surface conditions. An attempt is made to eliminate these frequencies from the displacement signals before they enter the computing section with the use of electronic filters. After the signals enter the computing section, it would be desirable to reduce further the unwanted frequencies—certainly not to amplify them. The circuit is then more likely to be stable and to give steady accurate solutions. The further reduction of the spurious signals is actually accomplished in the elimination of the differentiator circuit of FIG. 11 and the stabilizing of the circuit.

Figure 12:
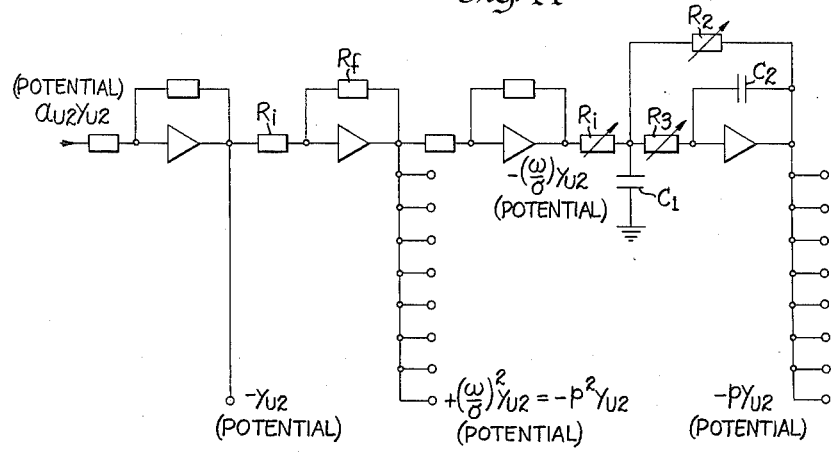
FIG. 12 is a modified circuit for obtaining first and second derivatives of input signals, by which differentiators are avoided.

Differentiators are to be avoided in all types of computing circuits. To see the reason, one has only to consider differentiating a step function or high frequency component signals. The derivative of a true step function is a spike signal of infinite height, and since operational amplifiers have a finite range of operating voltage, they are driven to overload. The circuit of FIG. 12 avoids the use of the differentiators of FIG. 11. Since only the rotational frequency, $\omega$, is of interest, the second derivative is easily obtained from the displacement signal by an operational amplifier functioning as a coefficient multiplier with a gain (6.19) $\quad \frac{R_f}{R_i} = \left( \frac{\omega}{\sigma} \right)^2$ where $\sigma$ is obtained from the relation $$\frac{d}{dt} = p = \sigma \rho$$

used in the normal scaling of equations. The first derivative is obtained from the last two amplifiers of FIG. 12 where the input is the negative of the second derivative. The coefficient multiplier has a gain of $$\frac{\sigma}{\omega}$$

whose output drives the last operational amplifier which has the following transfer function:

(6.20)
$$\frac{e_0}{e_1} = -\frac{R_2}{R_1} \frac{1}{1 + \left( R_2 + R_3 + \frac{R_2 R_3}{R_1} \right) C_2 p + R_2 C_2 R_3 C_1 p^2}$$

This operational amplifier then functions to solve a second order differential equation, but here it is used to obtain a phase shift of 90 degrees at the system rotational frequency, $\omega$.

If $p = j\omega$ (6.21)
$$\frac{e_0}{e_1} = -\frac{R_2}{R_1} \frac{1}{(1 - R_2 C_2 R_3 C_1 \omega^2) + j \left( R_2 + R_3 + \frac{R_2 R_3}{R_1} \right) C_2 \omega}$$

and if $$(1 - R_2 C_2 R_3 C_1 \omega^2) = 0$$

then $$\frac{e_0}{e_1} = j \frac{R_2}{R_1 C_2 \omega \left( R_2 + R_3 + \frac{R_2 R_3}{R_1} \right)}$$

For unity gain $$1 = R_1 C_2 \omega \left( 1 + \frac{R_3}{R_2} + \frac{R_3}{R_1} \right)$$

If $$\frac{R_3}{R_2} = \frac{R_3}{R_1} = 1$$

the following list of values for the resistances as a function of $\omega$ is obtained when $C_1 = 0.0794$ microfarad and $C_2 = 0.00885$ microfarad are held constant:

$\omega = 377$ (60 cycles)
$\quad R_1 = R_2 = R_3 = 100K$
$\omega = 314.5$ (50 cycles)
$\quad R_1 = R_2 = R_3 = 120K$
$\omega = 251.5$ (40 cycles)
$\quad R_1 = R_2 = R_3 = 150K$ (6.22)

Figure 13:
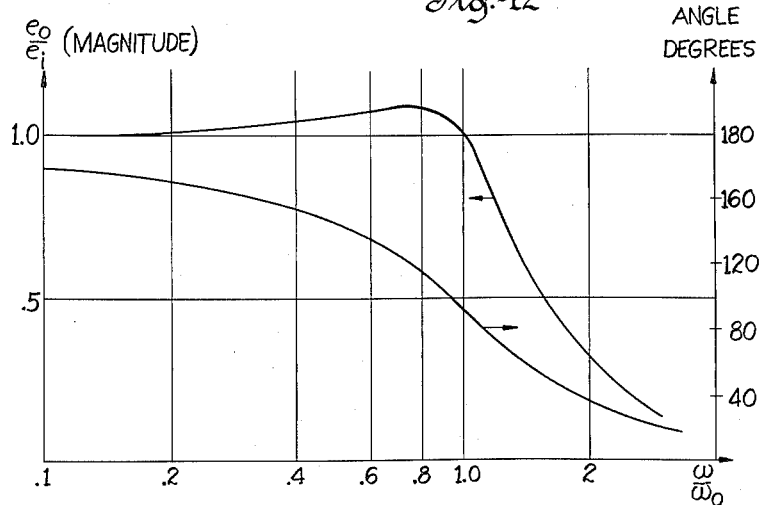
FIG. 13 is a graph showing the frequency characteristic of operational amplifiers used in obtaining first derivatives and for stabilizing the computer circuit.

A plot of the magnitude and phase of $$\frac{e_0}{e_i} \text{ versus } \frac{\omega}{\omega_0}$$

is shown in FIG. 13. It is noted that speed of the rotating system must be held reasonably constant to avoid errors due to phase and amplitude change. However, since the forces of unbalance to be obtained as solutions are functions of $\omega^2$, constant speed is already a requirement.

It was discovered that the complete circuit, constructed on the basis of the design discussed thus far, was unstable. With all inputs disconnected there was D.C. voltage in the circuit ranging from a few volts to aproximately 20 volts, even though the amplifiers were drift stabilized, and superimposed on this D.C. voltage were oscillations of a composite of frequencies. Peaks of these oscillations drove the amplifiers into overload. By modifying the basic equation circuit of FIG. 8 of which there are five, the complete circuit was made stable. The principle was to effectively shift the phase angle of the voltage of shaft frequency by 360 degrees and at the same time attenuate the higher frequencies and maintain unity gain at zero frequency. The modified circuit of FIG. 8 is shown in FIG. 9 where the two additional amplifiers perform the same function as the amplifier used in obtaining the first derivative of the shaft displacement signals of FIG. 12. Each produce a shift of 90 degrees in the voltage of shaft rotation frequency and a third amplifier, not shown, produces the required sign change. The values of the impedances are the same as those given in Equations 6.22 and the frequency characteristics shown in FIG. 13 apply.

Lag units consisting of operational amplifiers with a capacitor, $C_2$, in parallel with the feedback resistor, $R_2$, were first considered for stabilizing the circuit. The transfer function is $$\frac{e_0}{e_i} = -\frac{R_2}{R_1} \frac{1}{1+R_2 C_2 p}$$

where $R_1$ is the input resistor. Three of these were required. The D.C. gain, or zero frequency gain, for this method was eight times the gain at the frequency of interest as compared to equal gain for the method described. Although the high frequency oscillation is eliminated, the D.C. voltage in the complete circuit increases.

This balancing circuit also has the capacity to solve Equations 6.14, 6.15 and 6.16 for the simulator if provision is made for increasing the number of voltages that could be summed in the computer. By inspection of Equations 6.14, there are 20 voltages to be added as compared to a maximum of 17 for the balancing circuit. All the coefficients of the equations have the proper algebraic sign for summing with one amplifier but to have so many inputs would make scaling difficult and perhaps impossible in keeping the input impedances as seen by the driving amplifiers sufficiently high. By assuming negative forces of unbalance, $U_{u2}$, available, these six voltages could be summed in separate adders and the output of these adders fed to one of the inputs of the adders of the other group.

The application or use of the rotating system analyzer should be relatively apparent. Considering the block diagram of FIG. 1, it will be seen that the hybrid T is arranged with the short or terminals of the legs thereof so set with relation one to another that the T is balanced and has the properties of a bridge circuit. That is, all four arms of the hybrid T, when set to have matched impedances and power enters the arm from the oscillator, inphase waves propagate in the colinear arms 19 and 20, but the dominant wave is excluded from the E or series arm having crystal 16. Consequently, upon rotation of the rotor it will be seen that an unbalanced condition seen by the microwave pickup as a change of position of the surface of the rotor will be reflected through the hybrid T. Since there is no cross coupling between the E arm having the crystal and the H arms, if the impedance of one of the colinear arms 19 or 20 is mismatched while power is supplied from the oscillator, reflected power from the mismatched colinear arm (in this case arm 20) will be introduced into the arm with the crystal. In arranging the apparatus the crystal holder is preferably connected to the H arm of the hybrid T through a wave meter which is calibrated to read directly the wave frequency. While the wave meter is then disposed in a vertical arm it could possibly transmit vibrations in a horizontal direction and therefore it is preferable that the wave meter be removed after the frequency has been established.

As mentioned above, the signals introduced from the microwaves to voltage by the crystals are amplified and filtered and then fed to the computer component. Each signal from each detector, using possibly five detectors in an analysis of the particular rotating shaft, supplies the unknowns to the computer component unit which is set in accordance with the second order linear differential equation describing the mechanical vibrations in the mechanical vibrator system. The output of the computer corresponding to each of the inputs is a sinusoidal trace on the oscilloscope, constituting the solution of the differential equation. The oscilloscope is shown diagrammatically in FIGS. 1 and 14 where it is labeled "viewer." The magnitude of the curve gives the force of unbalance and from the curve the angles of these forces and their relationships locate their relative positions around the rotor. If desired, the individual solutions corresponding to each of the inputs can be viewed individually or, using a multichannel oscilloscope, all of the solutions may be viewed simultaneously. In addition, the trace solution on the scope may be viewed in relation to a reference trace curve obtained as schematically shown in the block diagram by feeding a signal at the frequency of rotation of the rotor. For analysis purposes it may be even desirable to create an artificial index of reference for analyzing the trace curves. This may be accomplished by adding a weight of known amount at a predetermined angular position on the rotor with respect to its axis. Then by rerunning the rotor a trace curve will include the solution reflected because of the known added weight and its position. In studying the trace curves of the unknown weights causing unbalance the added known weight will give a reference in magnitude as well as shaft position to easily locate the magnitudes and phase relationships of the unknown unbalance weights.

Although but two embodiments of the present invention have been illustrated and described, it will be apparent to those skilled in the art that various changes and modifications may be made therein without departing from the spirit of the invention or the scope of the appended claims.

What is claimed is:

1. The method of determining unbalance of a rotating shaft comprising producing a voltage signal in response to the condition of unbalance at each of a plurality of surface positions along a shaft, setting the parameters of a computer in accordance with the equations defining the second order linear differential describing mechanical vibrations in a mechanical vibrating system, feeding the voltage signals from each of the surface positions to the input of said computer and feeding the output of said computer to an oscilloscope to cause the solutions to be represented as a sinusoidal trace curve with the magnitude of forces represented by the amplitude of the curve.

2. The method claimed in claim 1 wherein a reference curve is fed to said oscilloscope and wherein the reference curve and the equation solution trace curve are caused to be simultaneously viewable on the oscilloscope that the magnitude of forces and phase angle relationship of the forces causing said trace curve are identified in relation to the reference curve.

3. The method of determining the unbalance of a rotating body comprising adding a known weight at a known circumferential position of said body at a selected station, rotating said body at a predetermined speed of rotation, separately detecting surface positions of said body during rotation at the station of said known weight and at least one other axially spaced station along said body where an unknown weight may affect the body rotating balance, feeding signals determinate of said detected surface positions to an oscilloscope, and causing separate sinusoidal trace curves to be registered on the oscilloscope screen to compare directly the trace curves produced by the unknown weight and the known weight to derive the relative magnitude and phase angle relationships of said two weights and their angular relationship.

4. An analyzer for determining the force of unbalance of a rotating system comprising,
   a hybrid T having first and second colinear arms, an H arm, and an E arm,
   said T being disposed at a selected station of the system with the surface of the system terminating said first colinear arm and varying the effective length of said first colinear arm as the system vibrates from the forces of unbalance,
   means terminating said second colinear arm at a length related to the length of said first colinear arm,
   an oscillator connected to said H arm to produce in said E arm a microwave that varies as the effective length of said first colinear arm varies,
   transducer means mounted in said E arm to produce in response to said microwave an electrical signal that varies with the eccentricity of the system,
   a computer for solving second order differential equations describing vibrations in a mechanical system, the variables in said equations being represented by said electrical signal produced by said transducer means,
   means for supplying said electrical signal from said transducer means to said computer, and
   means providing a reference signal for determining the angular location in the system of the force of unbalance.

5. The analyzer of claim 4 wherein the parameters of the computer are set in accordance with the following formulae wherein the forces at the stations along the rotating system are defined mathematically as $$[[(m_{iq}p^2 + K_{iq}p)y_{iq} + U_{iq}]]_{q=1,\ldots z\ i=1,2,\ldots n_q}$$

where $U_{iq} = m'_{iq}p^2 r_{iq}$ is the force of unbalance, $z$ is the number of spans, and $n_q$ is the number of stations or masses in span $q$, and wherein the distances of deflection are defined in terms of the static influence coefficients and the rotational forces as $$\left[\left[\sum_{i=1}^{n_q}\sum_{q=1}^{z} A_{uviq} P_{iq}\right]\right]_{v=1,\ldots z\ u=1,2,\ldots n_v}$$

where $n_v$ is the number of stations in the span being considered.

6. The analyzer of claim 4 including means for presenting the output of the computer solutions to the equations in sinusoidal form with the magnitude of the output being proportional to the magnitude of the unbalance and whereby the sinusoidal trace representation provides the angles of those forces and their phase relationship with reference to position around the axis of the rotating system.

7. The analyzer of claim 5 wherein there is provided an oscilloscope means connected to the output of said computer with the solution of said formulae represented on said oscilloscope as a sinusoidal curve and wherein said reference means provides a reference sinusoidal curve on said oscilloscope at the frequency of rotation of the rotating system.

8. An analyzer for determining the force of unbalance of a rotating system comprising:
   a plurality of hybrid junctions each having first and second colinear arms, an H arm, and an E arm,
   each of said hybrid junctions being disposed with the surface of the system at a selected station terminating its first colinear arm and varying the impedance of its first colinear arm as the system vibrates from the forces of unbalance, each said second colinear arm being terminated at a length related to the length of its associated first colinear arm,
   oscillator means connected to each said H arm to produce in each said E arm a microwave that varies as the impedance of the associated first colinear arm varies,
   microwave detector means mounted in each said E arm for producing in response to said microwave an electrical signal that varies as the surface position of the system at the associated station changes,
   a computer for generating parameters and solving groups of second order differential equations, the variables in said equations being represented by the electrical signals from said detector means, and
   means for supplying said electrical signals to said computer.

9. The rotating system analyzer of claim 8 including an oscilloscope and means for supplying the output solution of said equations from said computer to said oscilloscope with the solution represented on said oscilloscope as a sinusoidal trace curve.

10. The rotating system analyzer of claim 9 including means for supplying a reference signal to said oscilloscope presenting a reference curve thereon of sinusoidal form and having the same frequency as the rotating system.

11. An analyzer for determining the force of unbalance of a rotating system comprising:
    a plurality of hybrid junctions each having first and second colinear arms, an H arm, and an E arm,
    each of said hybrid junctions being disposed with the surface of the system at a selected station terminating its first colinear arm and varying the impedance of its first colinear arm as the system vibrates from the forces of unbalance, each said second colinear arm being terminated at a length related to the length of its associated first colinear arm,
    oscillator means connected to each said H arm to produce in each said E arm a microwave that varies as the impedance of the associated first colinear arm varies,
    microwave detector means mounted in each said E arm for producing in response to said microwave an electrical signal that varies as the surface position of the system at the associated station changes, said signal being a composite of the frequency of rotation and other frequencies,
    a computer for solving groups of second order differential equations describing vibrations in a mechanical system, variables in said equations being represented by only the component of the electrical signals from said detector means that is the frequency of rotation of the system, and
    means for supplying said electrical signals to said computer.

12. An analyzer for determining the force of unbalance of a rotating system comprising:
    a plurality of hybrid junctions each having first and second colinear arms, an H arm, and an E arm,
    each of said hybrid junctions being disposed with the surface of the system at a selected station terminating its first colinear arm and varying the impedance of its first colinear arm as the system vibrates from the forces of unbalance, each said second colinear arm being terminated at a length related to the length of its associated first colinear arm,
    oscillator means connected to each said H arm to produce in each said E arm a microwave that varies as the impedance of the associated first colinear arm varies,
    microwave detector means mounted in each said E arm for producing in response to said microwave an electrical signal that varies as the surface position of the system at the associated station changes, said signal being a composite of the frequency of rotation of the system and other frequencies,
    a computer for solving groups of second order differential equations describing vibrations in a mechanical system, the variables in said equations being represented by the electrical signals from said detector means, said computer including means for shifting the phase of said electrical signals and for multiplying said signals by predetermined coefficients to solve for the unbalance of said system that is described by the frequency component of said signals that is the frequency of rotation of the system, and means for supplying said signals to said computer.

References Cited in the file of this patent

UNITED STATES PATENTS

| | | |
|---|---|---|
| 2,331,733 | Senger | Oct. 12, 1943 |
| 2,596,531 | Clarke | May 13, 1952 |
| 2,673,031 | Piety | Mar. 23, 1954 |
| 2,711,289 | Zworykin | June 21, 1955 |
| 2,771,243 | Wolin et al. | Nov. 20, 1956 |
| 2,799,168 | Federn et al. | July 16, 1957 |
| 2,815,666 | Pischel | Dec. 10, 1957 |

FOREIGN PATENTS

| | | |
|---|---|---|
| 745,657 | Great Britain | Feb. 29, 1956 |